Dec. 26, 1961  W. HAHN  3,014,418
PHOTOGRAPHIC LENS SHUTTER
Filed Oct. 5, 1959
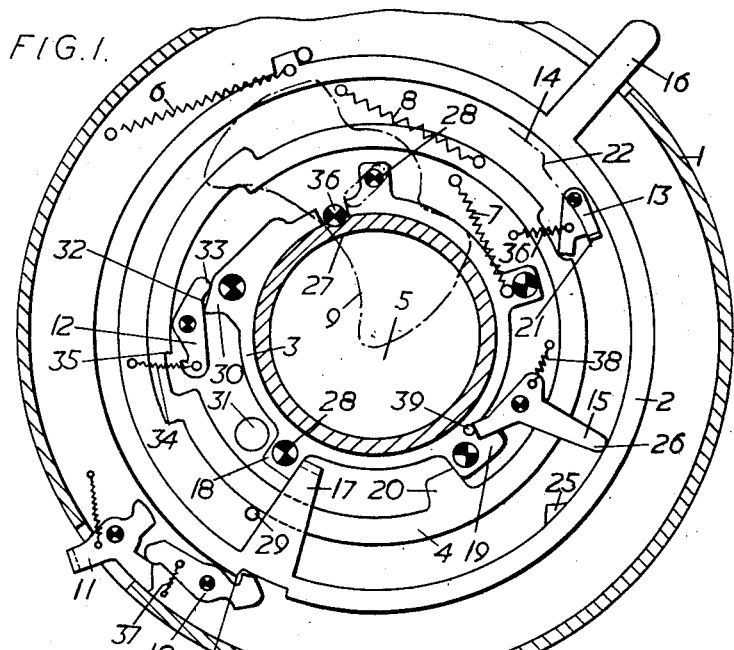
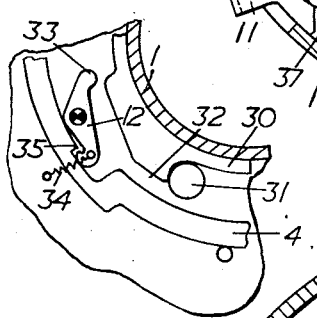
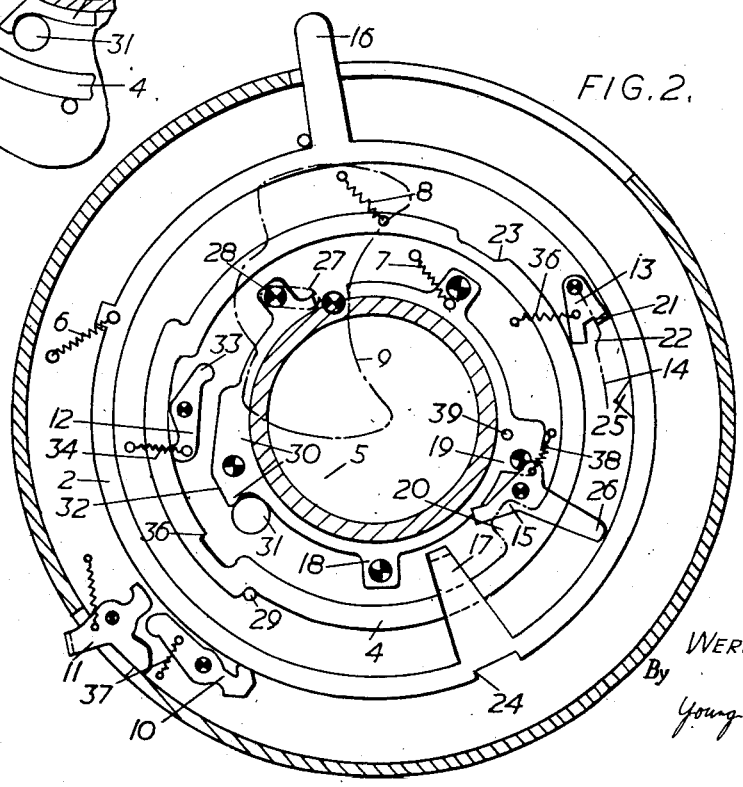
Inventor
WERNER HAHN.
By
Young & Thompson
Attorney

United States Patent Office 3,014,418
Patented Dec. 26, 1961

3,014,418
PHOTOGRAPHIC LENS SHUTTER
Werner Hahn, Dresden, Germany, assignor to VEB Kamera -und Kinowerke Dresden, Dresden, Germany
Filed Oct. 5, 1959, Ser. No. 844,433
3 Claims. (Cl. 95—63)

This invention relates to a photographic lens shutter with a supplementary device for obtaining extremely short exposure times.

Devices of this kind have already been disclosed. These, however, had the disadvantage that either the additional driving mechanisms had to be tensioned by hand separately or if desired jointly tensioned by the adjustment movement of the exposure time adjusting ring. This was disadvantageous especially since on the one hand special operations had to be carried out and on the other hand the movement of the exposure time adjustment member was perceptibly obstructed.

The object of the invention is to provide a supplementary device for obtaining extremely short exposure times, which avoids the above-mentioned disadvantages, that is to say especially can be operated without special operations and without special force expenditure.

According to the invention, this is achieved by providing a supplementary blade driving ring with a supplementary driving spring, the said driving spring being jointly tensioned on the operation of the shutter tensioning lever and the supplementary blade driving ring being adapted to be secured in the tensioned position by means of pawls. Two pawls are preferably provided to secure the supplementary driving ring in the tensioned position. The first pawl is controlled by the exposure time adjusting ring and the second pawl by a shutter part, for example the blade driving ring, running down after the operation of the shutter release. In addition, the supplementary blade driving ring does not support the blade driving ring to the end of each exposure process, but its running-down path is advantageously already limited beforehand by means of a stop. In this way, an excessively hard contact is avoided. Further details will be apparent from the exemplified illustration of a shutter according to the invention.

FIGURE 1 shows the shutter in the tensioned position,

FIGURE 2 shows the shutter after a photograph has been taken with an extremely short exposure time and FIGURE 3 is a partial elevation of the interior of the shutter.

In the shutter housing 1 (compare FIGURE 1) the tensioning ring 2, the blade driving ring 3 and the supplementary blade driving ring 4 are mounted rotatably concentrically to the light aperture 5. The said rings are loaded with springs 6, 7 and 8. The blade driving ring 3 is connected in known manner to the blades 9 rotatable about the bearing point 36. The cocking ring 2 is held by the arresting lever 10, which co-operates with the release lever 11. Pawls 12 and 13 are also provided and secure the supplementary driving ring 4. The pawl 13 is controlled by the cam 14 of an exposure time adjustment ring (not shown in detail). A blocking lever 15 holds the blade driving ring 3 in the tensioned position. The mode of operation of the device is as follows: The run-down shutter mechanism (compare FIGURE 2) is tensioned by moving the manipulator 16 projecting out of the shutter housing 1 to a cocked position. On the rotation of the cocking ring 2 in the clockwise direction both the blade driving ring 3 and the supplementary blade driving ring 4 are rotated in the same direction towards their cocked positions, since the arm 17 projecting radially inwards from the cocking ring coacts with the lug 18 provided on the blade driving ring 3, and the projection 19 of the blade driving ring 3 coacts with the projection 20 on the supplementary blade driving ring 4. In these circumstances, springs 6, 7 and 8 attached to the cocking ring 2, the blade driving ring 3 and the supplementary driving ring 4 are tensioned. Towards the end of the tensioning process the pawls 10, 12, and lever 15 and—if the shortest exposure time has not been set—the pawl 13 as well are drawn into the locking position by their return springs 34, 36, 37 and 38 (compare FIGURE 1).

If a photograph is to be taken with the shortest exposure time, the cam 14 is rotated in the clock-wise direction. In these circumstances the lug 21 of the pawl 13 slides over the cam 22 of the cam 14 and is rocked out of the path of the notch 23 (FIGURE 2) in the anti-clockwise direction.

On operation of the release lever 11 the arresting lever 10 is lifted out of the notch 24 of the cocking ring 2. In consequence, the spring 6 can turn the cocking ring 2 in the anti-clockwise direction out of the position shown in FIGURE 1 into the position shown in FIGURE 2. On this running-down movement of the cocking ring 2 the cam 25 strikes against the arm 26 of the lever 15, which is thus rotated in the anti-clockwise direction and is disengaged from the pin 39. The blade driving ring 3 is thus released. Under the action of the driving spring 7 the blade driving ring 3 rotates in the anti-clockwise direction. In these circumstances the concentric part 32 of the curved member 30 moves away from the end 33 of the pawl 12, so that the spring 34 can draw the said pawl 12 against the inner periphery of the supplementary blade driving ring 4. Since the pawl 13 had previously been rocked out of the notch 23 by the prior setting of the shortest exposure time, the supplementary blade driving ring 4 follows the projection 19 of the blade driving ring 3 with its projection 20. The pawl 12 can thus not drop into the notch 35. By the supplementary driving spring 7 the supplementary blade driving ring 4 accelerates the running-down of the blade driving ring 3, which in turn causes the blades 9 to be freed by way of the pin-slot connection 27, 28 provided, and the subsequent re-covering of the light aperture 5. The pin 29 serving as a stop limits the running-down path of the supplementary blade driving ring 4, before the blade driving ring 3 strikes against the pin 31 by its curved member 30. This pin may preferably have shock-absorbing properties, being made from a rubberlike material.

When an exposure is made without using the supplementary blade driving ring, the pawl 13 holds the supplementary blade driving ring 4 in the tensioned position. In consequence, the supplementary blade driving ring 4 cannot lag behind the running-down blade driving ring 3. Instead, the spring 34 draws the pawl 12 into the notch 35 of the supplementary blade driving ring 4 (compare FIGURE 3). If, after this exposure, the exposure time adjusting ring is to be set to the shortest exposure time, the pawl 13 is lifted out of the notch 23. The supplementary blade driving ring 4 cannot run down, however, because the pawl 12 is in engagement with the notch 35 of the supplementary blade driving ring 4. The supplementary blade driving ring consequently remains arrested. Only when the blade driving ring is cocked is the supplementary blade driving ring 4 freed of the pawl 12 securing it. Then, however, the supplementary blade driving ring is held by the projection 19 of the blade driving ring 3 (compare FIGURE 1).

I claim:
1. A photographic between-the-lens shutter comprising a shutter housing, a plurality of shutter blades rotatably mounted within the housing, a blade driving ring movable between a rest position and a cocked position having drive pins which extend into slots provided in the blades, a cocking ring mounted in the housing which is movable between a rest position and a cocked position for moving said blade driving ring into its cocked position, a supplementary blade driving ring mounted in the housing and movable between a rest position and a cocked position, a plurality of springs connected respectively between said cocking ring, blade driving ring and supplementary blade driving ring and the housing for urging said rings towards their rest position, first means for releasably holding said cocking ring in its cocked position, a first projection provided on said cocking ring, a second projection provided on the blade driving ring and lying in the path of said first projection so as to be driven thereby as the cocking ring is moved towards its cocked position, second means for releasably holding said blade driving ring in its cocked position, a third projection provided on said blade driving ring, a fourth projection provided on said supplementary blade driving ring and lying in the path of said third projection so as to be driven thereby as the blade driving ring is moved towards its cocked position, a first pawl pivotally mounted on the housing capable of holding said supplementary blade driving ring in its cocked position, an exposure time setting member in the housing having a cam surface for moving said first pawl into two positions where it is alternately capable and incapable of holding said supplementary blade driving ring in its cocked position, a second pawl pivotally mounted on the housing capable of holding said supplementary blade driving ring in its cocked position, and a cam provided on said blade driving ring for moving said second pawl into two positions where it is alternately capable and incapable of holding said supplementary blade driving ring in its cocked position, said second pawl being moved to a position so as to be incapable of holding said supplementary blade driving ring when the blade driving ring is in its cocked position.

2. A photographic between-the-lens shutter according to claim 1, wherein a further cam is provided on the cocking ring which engages said second means to actuate the latter on the running down movement of said cocking lever thereby initiating the running down of said blade driving ring.

3. A photographic between-the-lens shutter according to claim 1, including lugs provided on the blade driving ring and the supplementary blade driving ring respectively, and stops provided on the housing which lie in the paths of said lugs respectively so as to be engageable therewith, said stops being arranged so that the additional blade driving ring is arrested in its running down movement before the blade driving ring comes to rest after its running down movement.

References Cited in the file of this patent
UNITED STATES PATENTS

| | | |
|---|---|---|
| 2,168,893 | Aiken | Aug. 8, 1939 |
| 2,718,835 | Fuerst | Sept. 27, 1955 |
| 2,931,285 | Hahn | Apr. 5, 1960 |